United States Patent
Chang et al.

(10) Patent No.: US 9,628,250 B2
(45) Date of Patent: Apr. 18, 2017

(54) ADVANCED BEAM-FORMING TECHNOLOGY WITH CROSS-POLARIZATION CANCELLATION SCHEMES

(75) Inventors: Donald C. D. Chang, Thousand Oaks, CA (US); Frank Lu, Reseda, CA (US); Yulan Sun, Ganoga Park, CA (US)

(73) Assignee: Spatial Digital Systems, Inc., Agoura Hills, CA (US)

( * ) Notice: Subject to any disclaimer, the term of this patent is extended or adjusted under 35 U.S.C. 154(b) by 1066 days.

(21) Appl. No.: 13/071,388

(22) Filed: Mar. 24, 2011

(65) Prior Publication Data

US 2012/0243581 A1 Sep. 27, 2012

Related U.S. Application Data

(60) Provisional application No. 61/273,502, filed on Aug. 1, 2009.

(51) Int. Cl.
*H04L 5/16* (2006.01)
*H04L 5/04* (2006.01)

(52) U.S. Cl.
CPC ..................... *H04L 5/04* (2013.01)

(58) Field of Classification Search
CPC .... H04L 5/04; H04L 5/16; H04Q 7/20; H04B 7/185; H04B 7/19
USPC ..... 455/103, 562, 422, 447, 429, 12.1, 13.2, 455/427
See application file for complete search history.

(56) References Cited

U.S. PATENT DOCUMENTS

| | | | |
|---|---|---|---|
| 4,575,862 A | | 3/1986 | Tahara et al. |
| 4,914,676 A | | 4/1990 | Iwamatsu et al. |
| 5,023,620 A | | 6/1991 | Matsuura |
| 5,068,667 A | | 11/1991 | Mizoguchi |
| 5,442,663 A | * | 8/1995 | Andersen et al. ............ 375/229 |
| 5,495,502 A | * | 2/1996 | Andersen ..................... 375/235 |
| 5,710,799 A | | 1/1998 | Kobayashi |
| 5,966,102 A | * | 10/1999 | Runyon ....................... 343/820 |
| 6,975,600 B1 | * | 12/2005 | Vaughan et al. ............. 370/321 |
| 7,053,813 B1 | * | 5/2006 | Hubbert et al. ............. 342/26 R |
| 7,068,990 B1 | | 6/2006 | Herbig |
| 7,706,787 B2 | * | 4/2010 | Malarky et al. ............. 455/429 |
| 7,834,803 B2 | * | 11/2010 | Weinstein ....................... 342/70 |
| 8,284,110 B2 | * | 10/2012 | Elliot et al. .................... 343/727 |
| 2003/0050015 A1 | * | 3/2003 | Kelly et al. .................. 455/67.4 |
| 2003/0224723 A1 | * | 12/2003 | Sun et al. .................... 455/12.1 |
| 2007/0285314 A1 | * | 12/2007 | Mortazawi et al. .......... 342/375 |
| 2008/0233865 A1 | * | 9/2008 | Malarky et al. ............. 455/12.1 |
| 2010/0067605 A1 | * | 3/2010 | Jongren ........................ 375/267 |
| 2011/0249712 A1 | * | 10/2011 | Hammarwall et al. ....... 375/220 |

(Continued)

*Primary Examiner* — Pablo Tran

(57) ABSTRACT

An advanced digital beam forming technique is achieved that is capable of simultaneously forming multiple beams and attenuating the cross-pol component at multiple locations. The proposed invention, comprising a series of signal inputs, optimization loops and weighting processes, successfully eliminates the side effect of an increase of the cross-pol in the process of beam-forming, thus reducing potential interference. This technique utilizes the orthogonally polarized signal component which is already available and can minimize both the horizontally polarized and vertically polarized cross-pol at the same time. The complexity of computation can be reduced by using only part of the orthogonal polarized components in the optimization.

17 Claims, 12 Drawing Sheets

(56) References Cited

U.S. PATENT DOCUMENTS

2013/0072125 A1* 3/2013 Yoon et al. ............... 455/67.11
2013/0162476 A1* 6/2013 Thomas et al. ............ 342/372
2013/0307716 A1* 11/2013 Mohamadi .................. 342/22
2014/0098689 A1* 4/2014 Lee et al. .................. 370/252

* cited by examiner

ADVANCED BEAM-FORMING TECHNOLOGY WITH CROSS-POLARIZATION CANCELLATION SCHEMES

RELATED APPLICATION DATA

This application claims the benefit, pursuant to 35 U.S.C. §119(e), of U.S. provisional application Ser. No. 61/273,502, filed Aug. 1, 2009.

BACKGROUND OF THE INVENTION

1. Field of the Invention

The present invention relates to the field of radio frequency communications and radio frequency technologies, more specifically the cancellation of the cross-polarized components of radio frequency transmissions. In particular, the invention relates to methods of forming adaptive cancellation schemes to decrease cross-polarized components using the co-polarized components from the orthogonal ports of an antenna array.

2. Description of Related Art

In radio frequency (RF) communications, radio wave polarization is the direction in which radio waves vibrate when propagating. There are two basic types of radio frequency polarization: linear polarization and circular polarization. Linearly polarized signals can vibrate in only one direction, either horizontally or vertically. On the other hand, circularly polarized signals propagate in a circular fashion with either left handed or right-handed rotation, forming a helical shape.

In most cases, an antenna feed can be regarded as two ports with orthogonal polarizations; for example, horizontal polarization (HP) and vertical polarization (VP). Each of the ports receives signal components that have the same polarization called co-pol. However, due to the imperfections of the polarizations of the receiver, each of the ports receives a small portion of orthogonal signal component called cross-pol which introduces interference to the signal. Thus, the received signal of HP and VP can be further broken down into four different parts, namely HP co-pol, HP cross-pol, VP co-pol and VP cross pol.

Since the cross-pol component is relatively small compared with the co-pol component, their influences are often ignored. For example, in the application of smart antenna arrays, digital beam forming techniques (DBF) may be used to increase antenna gain. These methods involve applying proper weightings to each element component in order to maximize co-pol in-phase alignments, resulting in increased signal strength in desired directions.

Although the cross-pol is small, it introduces interference and may limit system performance. In many applications, the cross-component should be attenuated below certain levels so that the antenna may function properly, either to fulfill performance parameters or to reduce interference to a usable level. One possible solution to this issue is using DBF, but considering both the co-pol and cross-pol component as optimization criteria. However, due to the limitation of degrees of freedom, the resulting additional constraint points may compromise average performance. Any improvement in cross-pol mitigation performance directly results in a degradation of co-pol performance. As a result, system performance cannot be improved by just adding extra constraint conditions; instead, additional auxiliary information will be necessary.

Our proposed invention takes advantage of the relationship between the four components of received signals, HP co-pol, HP cross-pol, VP co-pol and VP cross-pol, to minimize the cross-pol in each polarization. Since the degrees of freedom of the system have been greatly increased, the cross-pol component can be reduced significantly without the scarification of the co-pol performance, thus improving the performance of the whole system.

The following references are presented for further background information:

| U.S. Pat. No. | Issue date | Authors |
| --- | --- | --- |
| 4,575,862 | Mar. 11, 1986 | Masato Tahara et al. |
| 5,710,799 | Jan. 20, 1998 | Kenzo Kobayashi |
| 4,914,676 | Apr. 3, 1990 | Takanori Iwamatsu et al. |
| 7,068,990 | Jun. 27, 2006 | Gerhard Herbig |
| 5,023,620 | Jul. 11, 1991 | Toru Matsuura |
| 5,068,667 | Nov. 26, 1991 | Shoichi Mizoguchi |

SUMMARY OF INVENTION

The present invention pertains to an advanced digital beam forming technique that takes the advantage of the relationship between different polarization components (co-pol and cross-pol) to further improve the system performance by increasing the co-pol components while simultaneously suppressing the cross-pol components. More specifically, the advanced digital beam forming system comprises an antenna array and a receiver system, with the receiver system comprising at least one optimization loop, and at least one electronic weighting unit.

This invention takes received signals from the antenna array and sends them through the receiver system. The electronic weighting units will attach an electronic "weight" to each signal which gives the signal a numerical value based on its amplitude and phase. This is cross-referenced with a set of desired parameters. If the weightings do not match the pre-specified parameters, the weighted signals enter an optimization loop where the weightings, and consequently, phase and amplitude weightings, are updated. The signals are then cross-referenced desired parameters again, and this process continues until desired values are reached.

Signals received by each antenna element will then be transmitted to a digital beam forming processor which adaptively generates and applies appropriate beam wave vectors (BWV) to the signals received from each element of the array to create one or more coherent beams from received signals. Due to degree of freedom limitations, an improvement in the performance of cross-pol suppression will result in a compromise in the performance of co-pol component. Therefore, traditional beam forming techniques only focus on the co-pol's optimization because they have more weighting in the performance of the system.

Our proposed method provides an easy way to dramatically weaken the cross-pol component without sacrificing the co-pol component by using auxiliary information to increase the degrees of freedom of the system. For example, compared with HP cross-pol, VP co-pol is much larger and has the same polarization. Therefore, the HP cross-pol can be cancelled by VP co-pol if a small but properly designed weight is applied. On the other hand, the VP cross-pol component will be further diminished by the same weight, thus won't affect the HP co-pol component. By simply utilizing available information, the degrees of freedom are doubled and the system performance can be improved significantly. However, there are several drawbacks to this method of increasing resolution. More computational power is required as there is additional data to be processed within the optimization loop, adding cost and complexity. However, we can use the VP co-pol from part of the antenna elements to achieve the HP cross-pol cancellation which can help reduces the complexity of the computation.

An alternative embodiment of the system in accordance with the present invention comprises multiple antenna elements configured as an antenna array. Signals received or transmitted by each antenna element can be divided into two parts and output or input through two different ports according to their polarization mode. Each part of the signal includes two orthogonal components, co-pol and cross pol. The former part is the signal component that has the same polarization while the latter one is caused by the imperfection of the receiver and has the orthogonal polarization.

For instance, signals can be separated into two orthogonal parts, HP and VP. HP is composed of two orthogonal parts, HP co-pol and HP cross-pol. The former one is horizontally polarized and holds most of the energy of HP. The latter component is vertically polarized and is very small compared with HP co-pol. Similarly, VP co-pol is vertical polarized and relatively big while VP cross pol is horizontally polarized and relatively small.

BRIEF DESCRIPTION OF THE DRAWINGS

The objects, features and advantages of the present invention will become better understood from the following detailed descriptions of the preferred embodiment of the invention in conjunction with reference to the following appended claims and accompanying drawings where:

DETAILED DESCRIPTION OF THE PREFERRED EMBODIMENT

The present invention provides an advanced beam forming technique that not only forms beams using co-pol components, but also minimizes interference by attenuating the cross-pol components. In this section, detailed description will be included by using figures and examples, etc.

Figure 1:
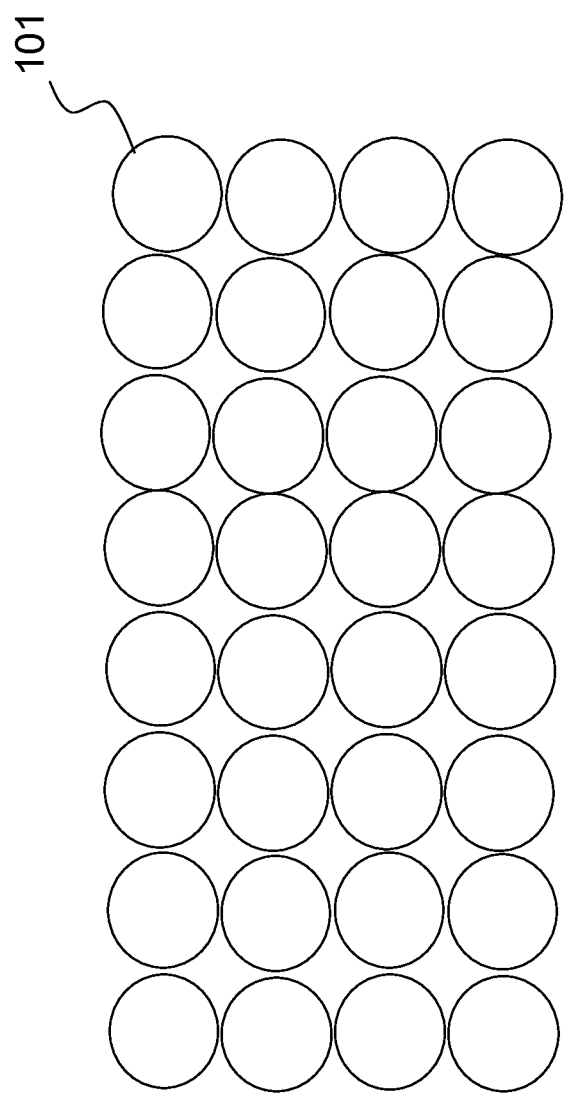
FIG. 1 shows the configuration of the antenna array which is composed of 32 conical feeds.

FIG. 1 shows the configuration of the antenna array used in the present embodiment. The antenna array is composed of conical feeds 101, of which each feed can be regarded as two orthogonally polarized feeds that output HP and VP components separately. Each polarized feed is supposed to receive and transmit signals with the same polarization called co-pol. However, due to the imperfections of the feeds, each feed receives and transmits a small portion of signal component with orthogonal polarization, called cross-pol.

Figure 2:
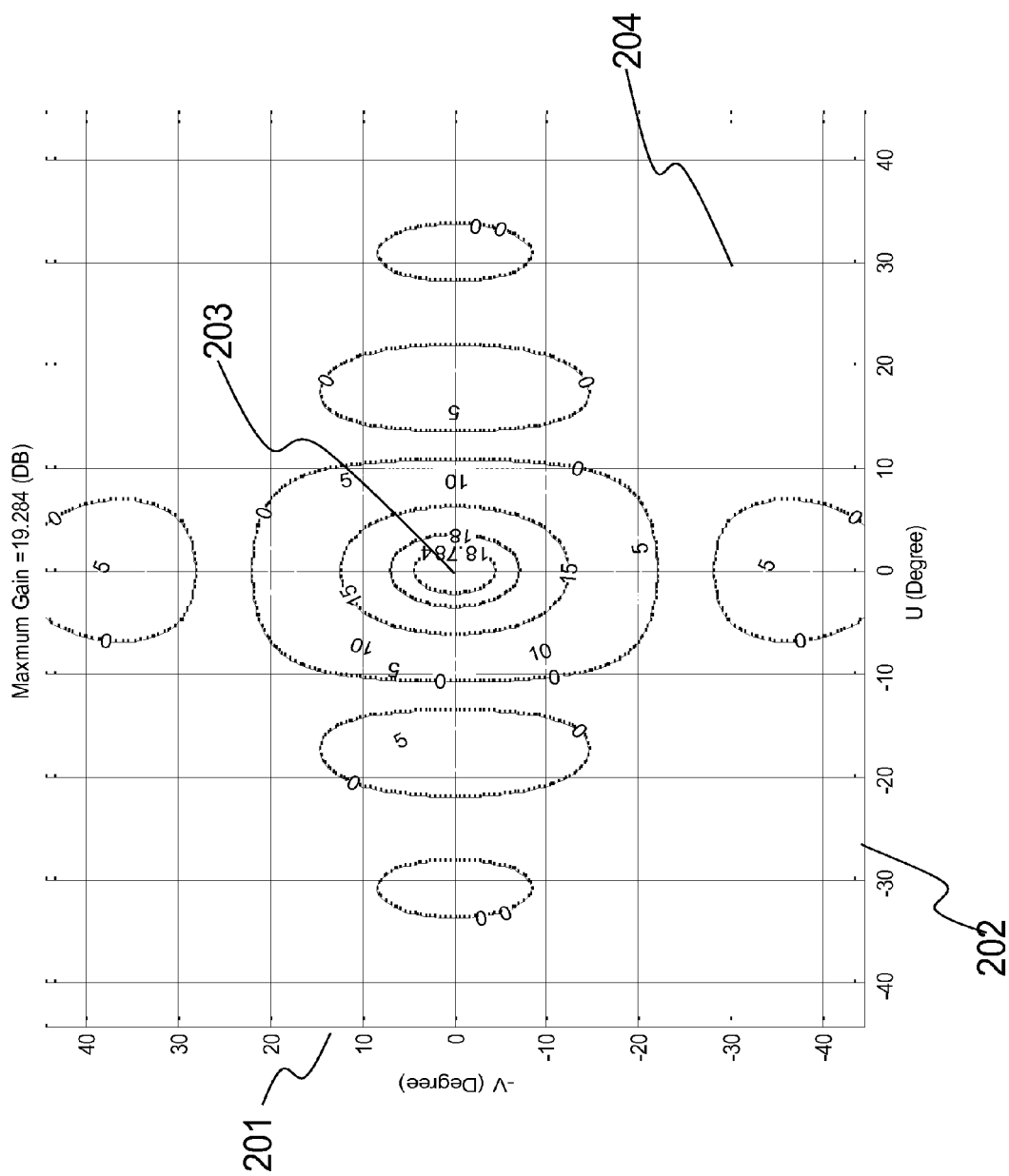
FIG. 2 shows the contour of summation of the HP co-pol component of the antenna array composed of 32 conical feeds.

FIG. 2 shows the contour plot of the antenna array's HP co-pol component which is calculated by summarizing all the HP co-pol of the conical feeds. 201 and 202 which range from −45 to 45 degree are the V- and X-axis of the UV plane, respectively. Maximum gain 203 of the antenna array is 19.284 dB.

Figure 3:
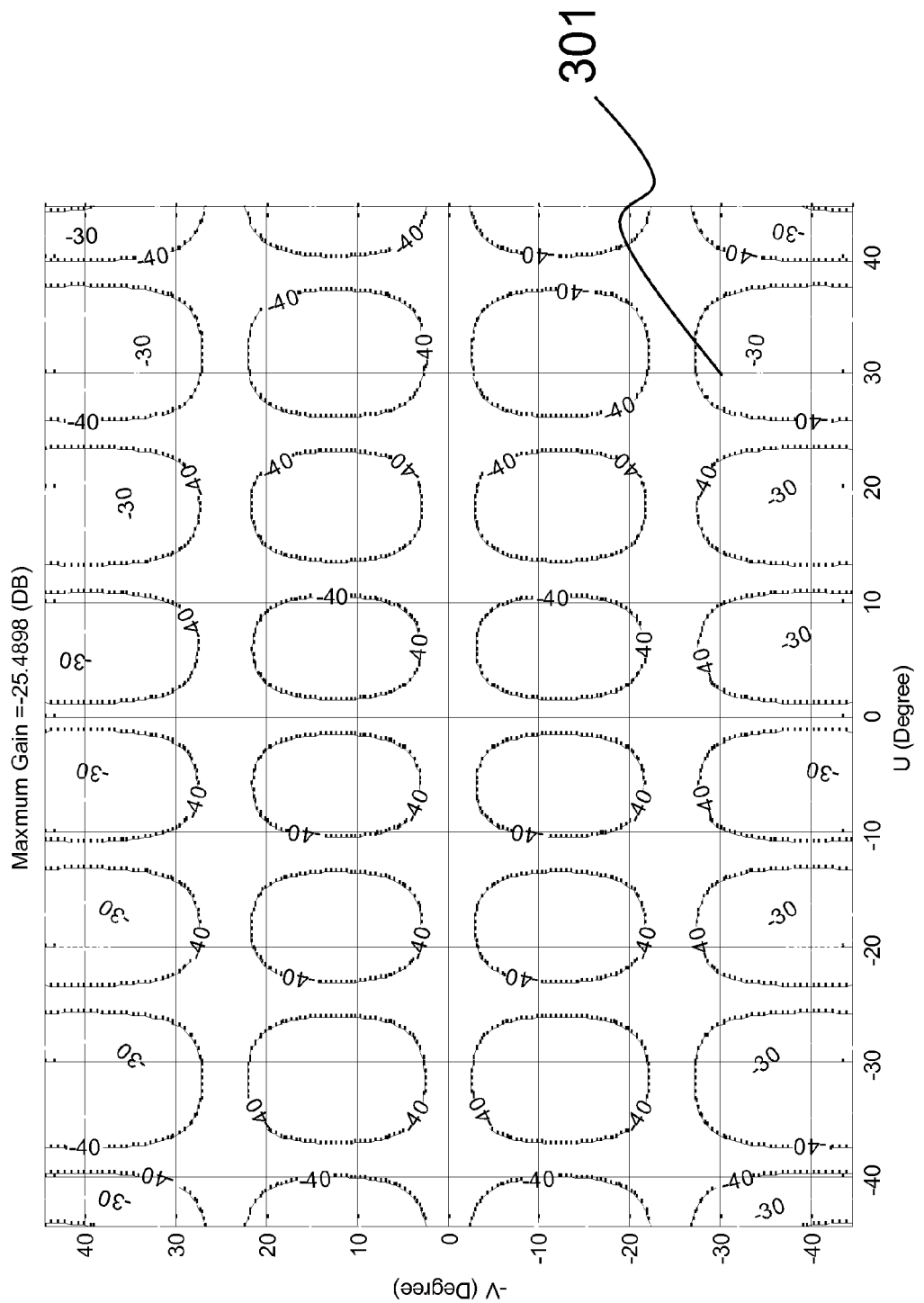
FIG. 3 shows the contour of the summation of HP cross-pol component of the antenna array composed of 32 conical feeds.

FIG. 3 shows the contour plot of the antenna array's HP cross-pol component. The maximum gain is −25.5 dB which is about 45 dB smaller than the maximum gain 203 of the co-pol component. Additionally, average gains of the HP cross-pol components are also small compared to HP co-pol.

Figure 4:
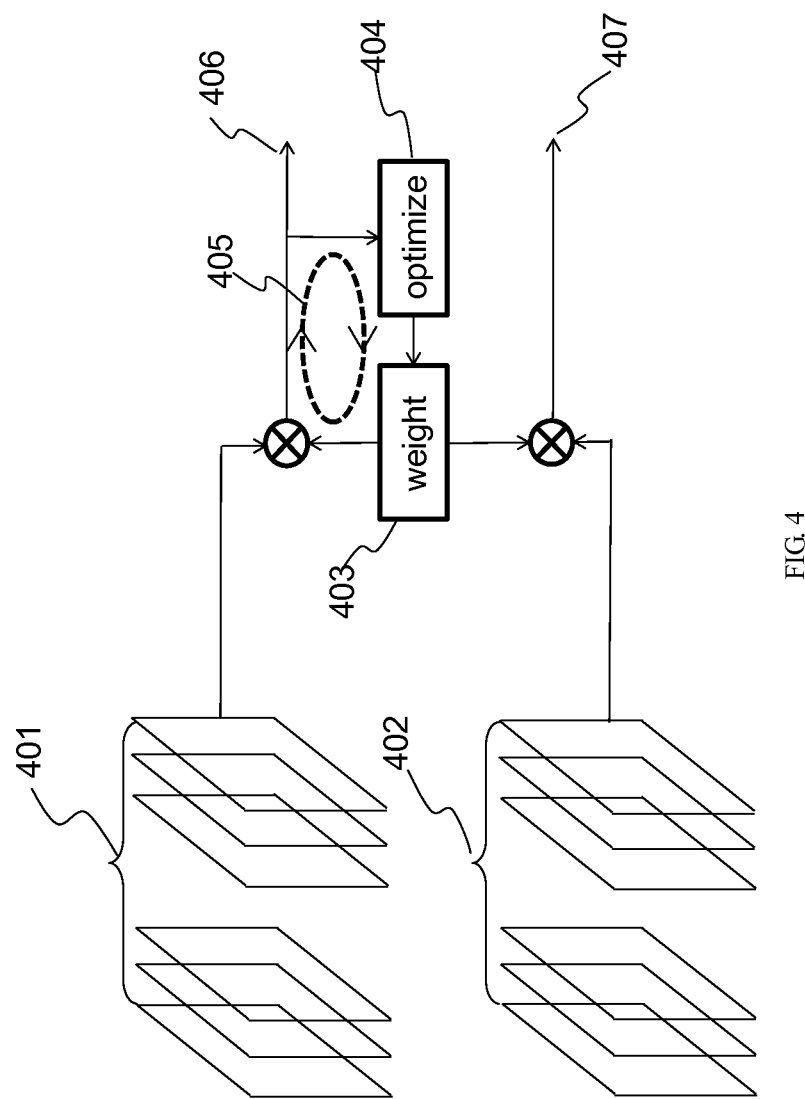
FIG. 4 illustrates the traditional digital beam forming technique which only optimize the HP co-pol component.

FIG. 4 shows the optimization scheme of traditional beam forming technique which only optimizes the HP co-pol component. HP co-pol components 401 from conical feeds and HP cross-pol 402 from feeds are all applied with weight vectors by the weighting unit 403. Weighting unit 403 is used to adjust the amplitudes and phases of the outputs of each antenna element to generate an updated HP co-pol output 406 and HP cross-pol output 407. New HP co-pol component 406 is then transmitted to optimization module 404 as feedback, wherein a new weight vector will be calculated based on certain adaptive algorithms. Optimization loop 405 will adaptively increase HP co-pol components at certain desired positions until predetermined parameters are met.

Figure 5:
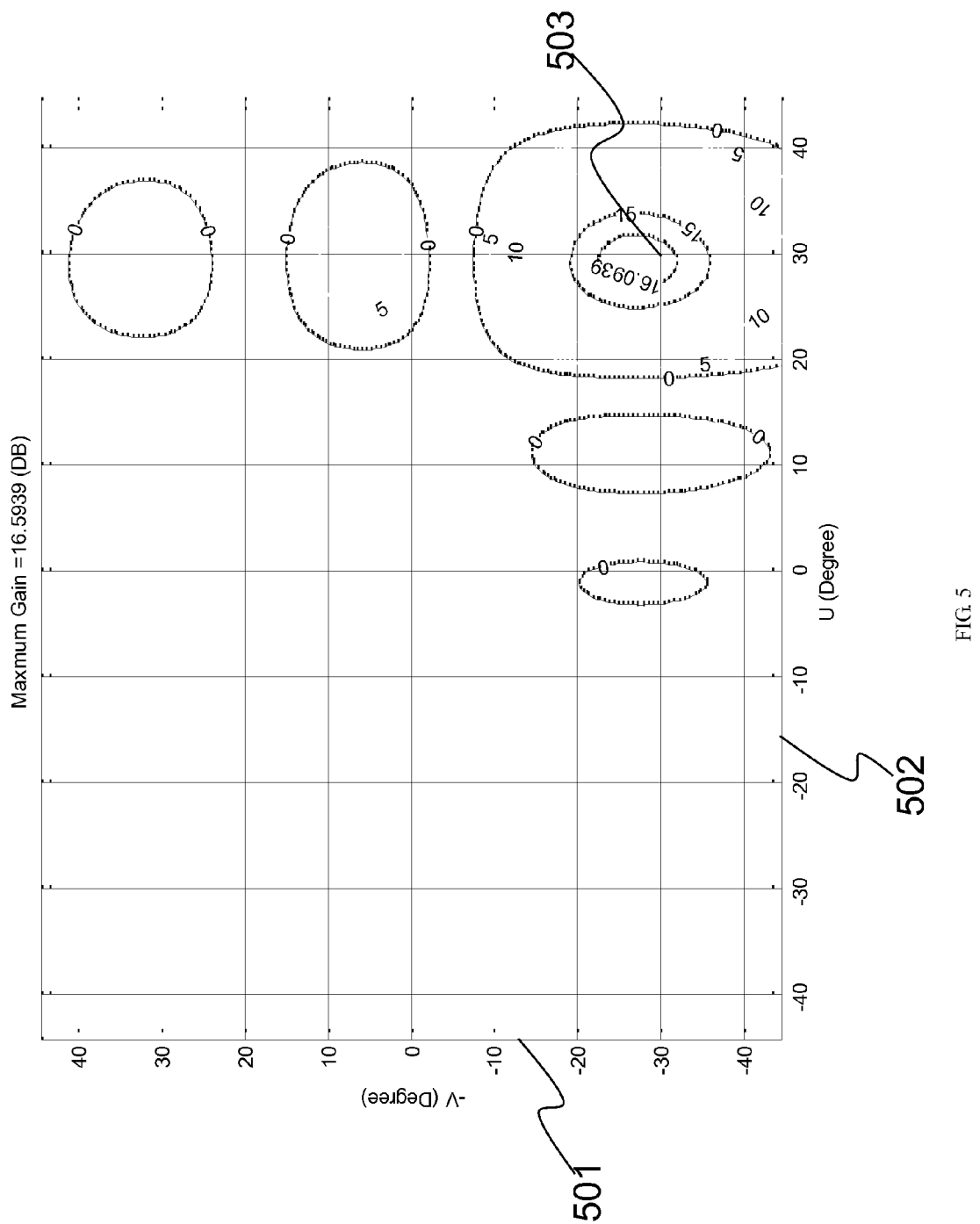
FIG. 5 shows the contour of the HP co-pol component after optimization with traditional beam-forming techniques.
Figure 6:
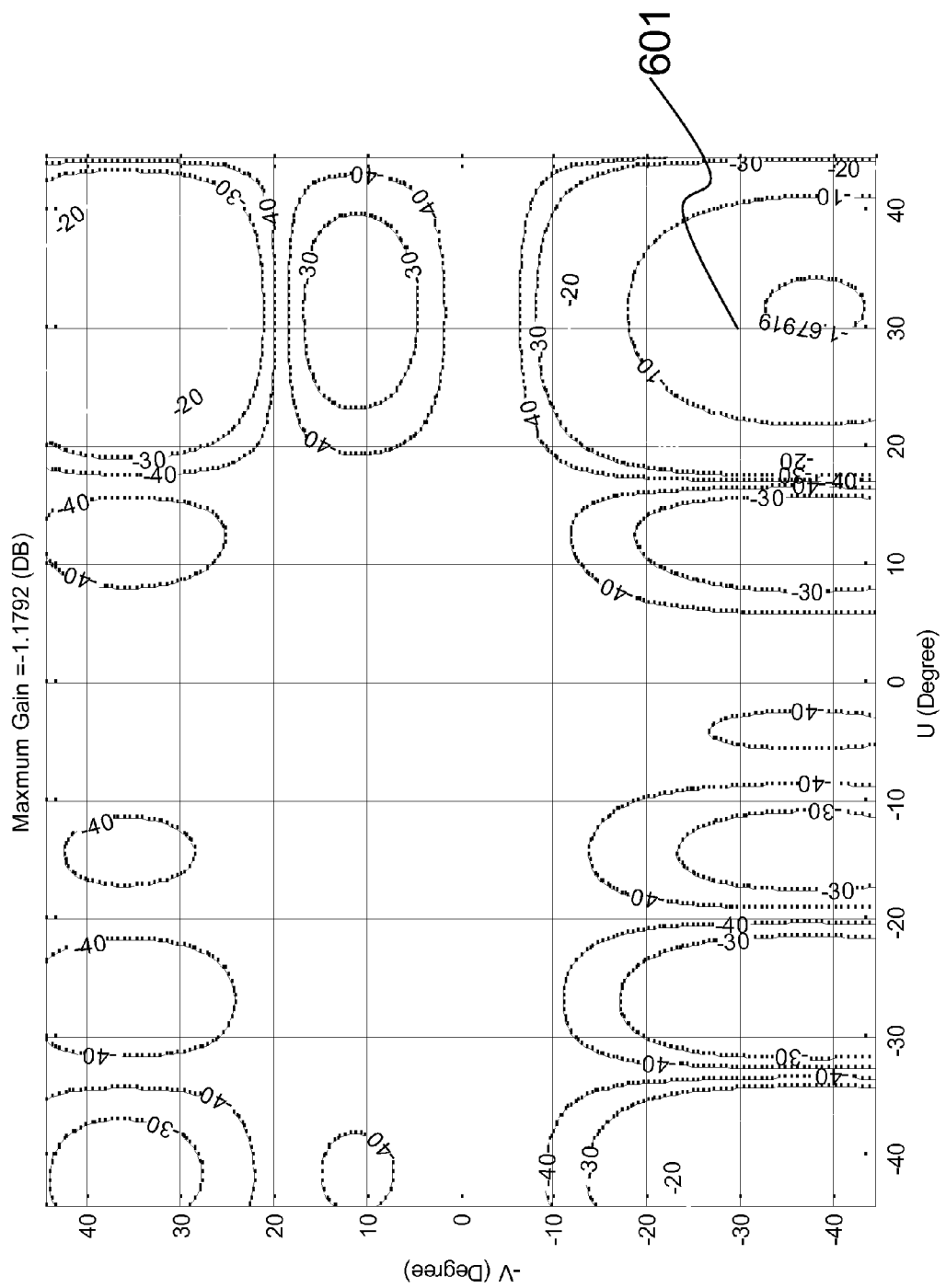
FIG. 6 shows the contour of the HP cross-pol component after optimization with traditional beam-forming techniques.
Figure 7:
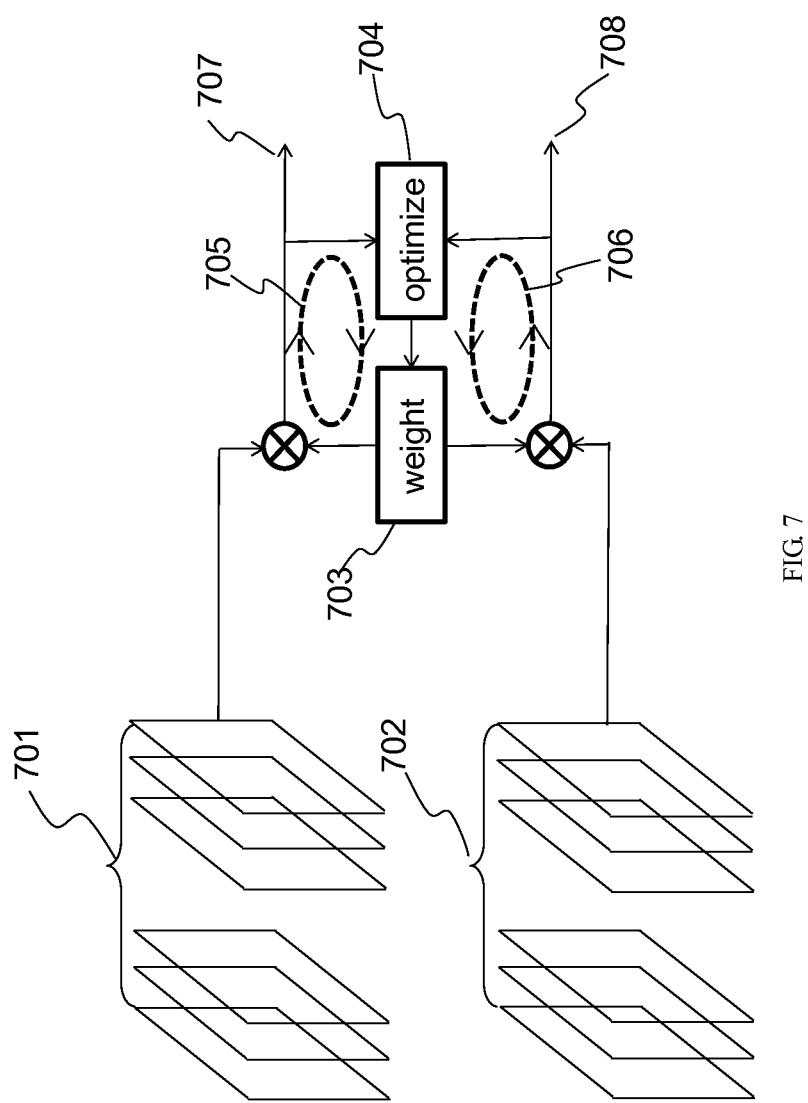
FIG. 7 illustrates the beam-forming technique that optimizes both HP co-pol and HP cross-pol component without using auxiliary information.
Figure 8:
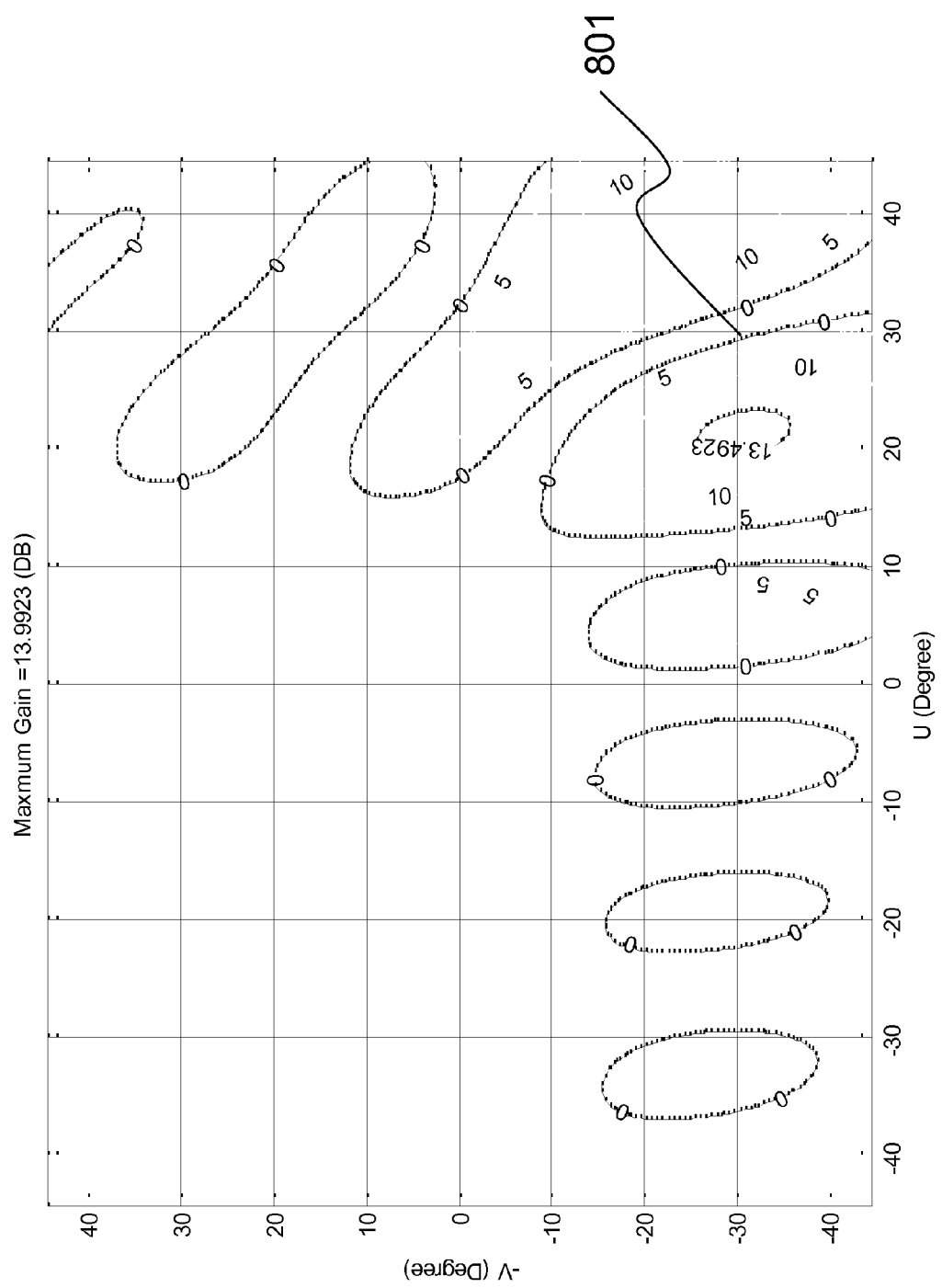
FIG. 8 shows the contours of the HP co-pol components utilizing beam forming techniques for optimization of both HP co-pol and HP cross-pol without auxiliary information.
Figure 9:
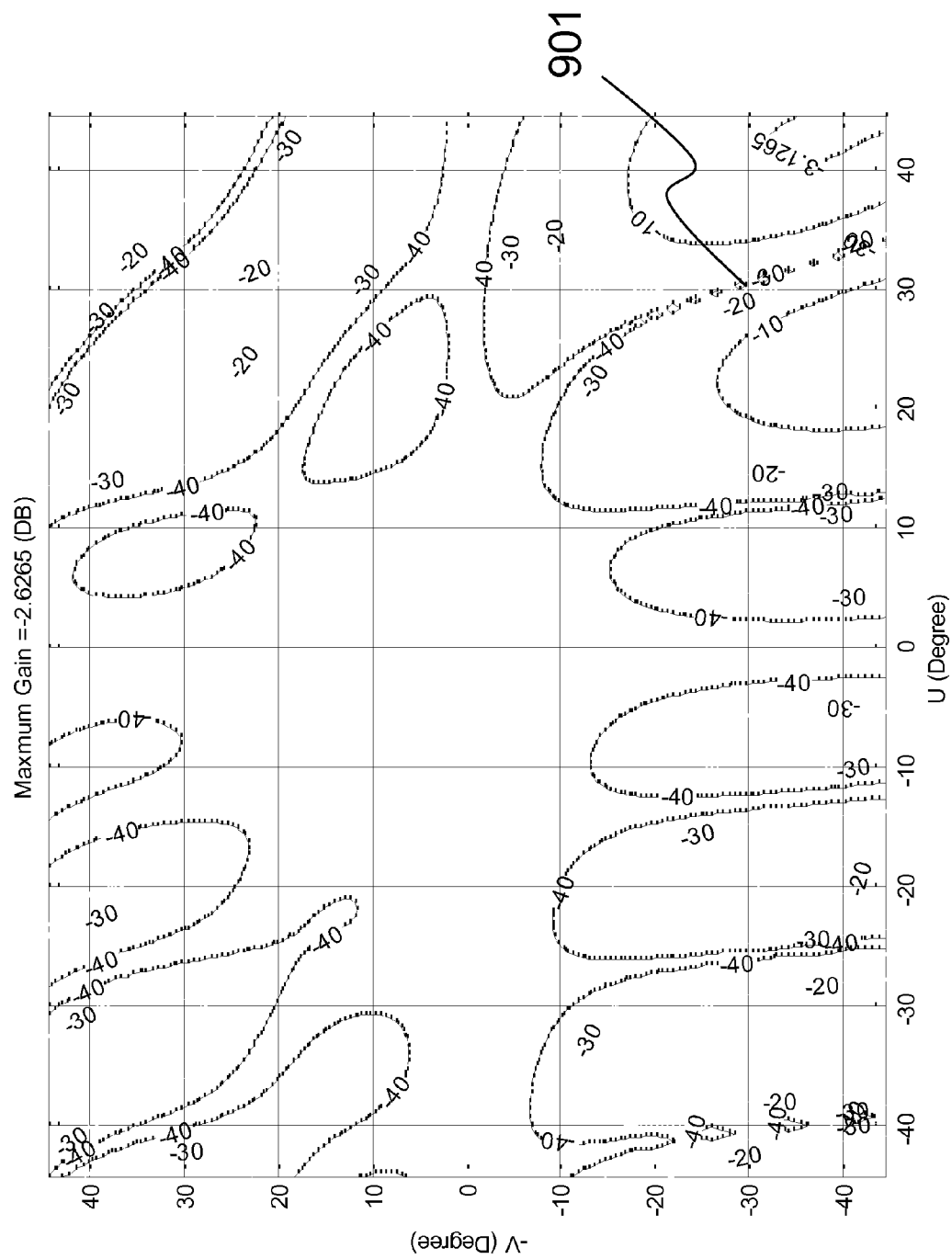
FIG. 9 shows the contours of the HP co-pol components utilizing beam forming techniques for optimization of both HP co-pol and HP cross-pol without auxiliary information.

FIG. 5 shows the result of forming a beam at (30, −30) degree on the UV plane. The co-pol energy increased significantly from less than 0 dB 204 to about 16.5 dB 503 at the desired point. However, the cross-pol component at (30, −30) degree also increased from about −40 dB 301 to around 0 dB 601. Although the co-pol performance has dramatically increased, since the optimization process only focus on the co-pol component, the cross-pol power has also increased significantly, leading to cross-pol created interference.

An attempt to solve this problem involved a method utilizing two optimization loops 705, 706, with the intention of maximizing co-pol component output 707 while minimizing the cross-pol component output 708. The results showed that the cross-pol did keep at around −30 dB 901; however, the co-pol output also remained below 0 dB 801.

Figure 10:
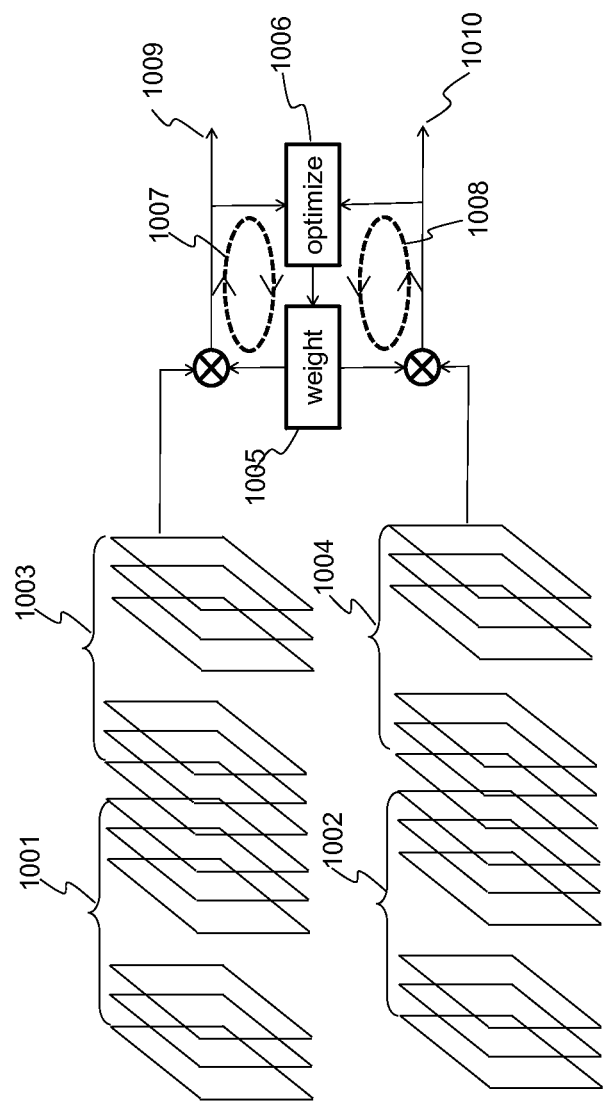
FIG. 10 illustrates the proposed beam-forming technique that also utilizes the VP component to minimize the HP co-pol components.

With the double optimization loop technique inadequately fulfilling our requirements, an alternative method is suggested, utilizing an advanced beam-forming technique that takes advantage of orthogonally polarized signal components to simultaneously increase co-pol energy and minimize the cross-pol energy at specified locations. As shown in FIG. 10, inputs from VP co-pol 1003 and VP cross-pol components 1004 are used as well as the inputs of HP co-pol 1001 and HP cross-pol components 1002. In this case, the size of the weight vectors 1005 increases from 32 to 64. The first 32 weight are applied on the HP component while the latter 32 are for the VP. The $33^{rd}$ to the $64^{th}$ weight are relatively small compared with the former 32 weights. These weights are used to decrease the energy of VP co-pol to cross-pol levels, while making the VP co-pol out of phase with HP cross-pol, thus cancelling the HP cross-pol. The VP cross-pol is further decreased with VP co-pol, so its influence on HP co-pol can be negated. Therefore, the degree of freedom of the system is doubled and performance is greatly improved.

Figure 11:
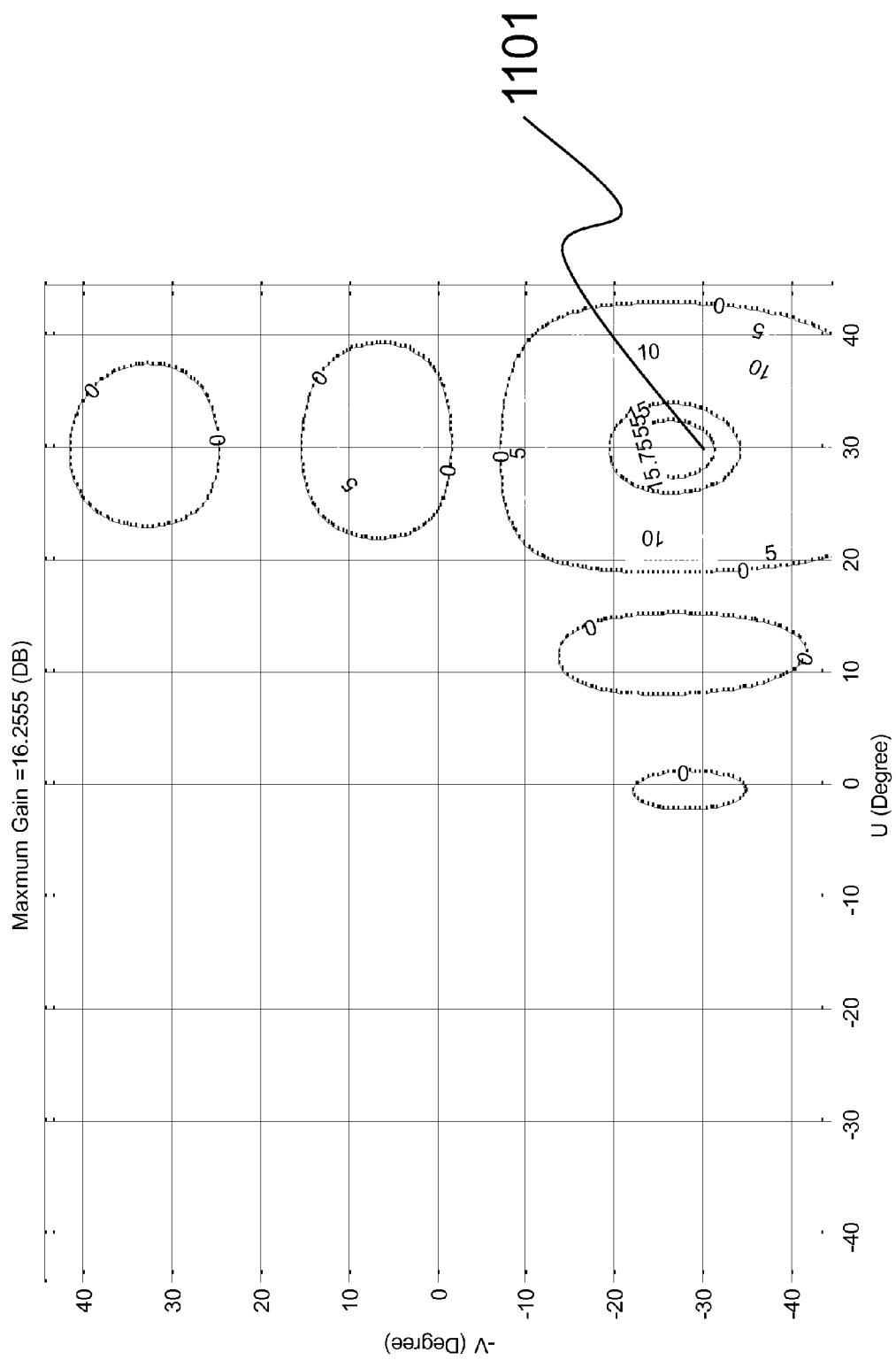
FIG. 11 shows the contours of the HP co-pol component using the proposed beam forming technique, which also uses the VP component for minimization of HP cross-pol.
Figure 12:
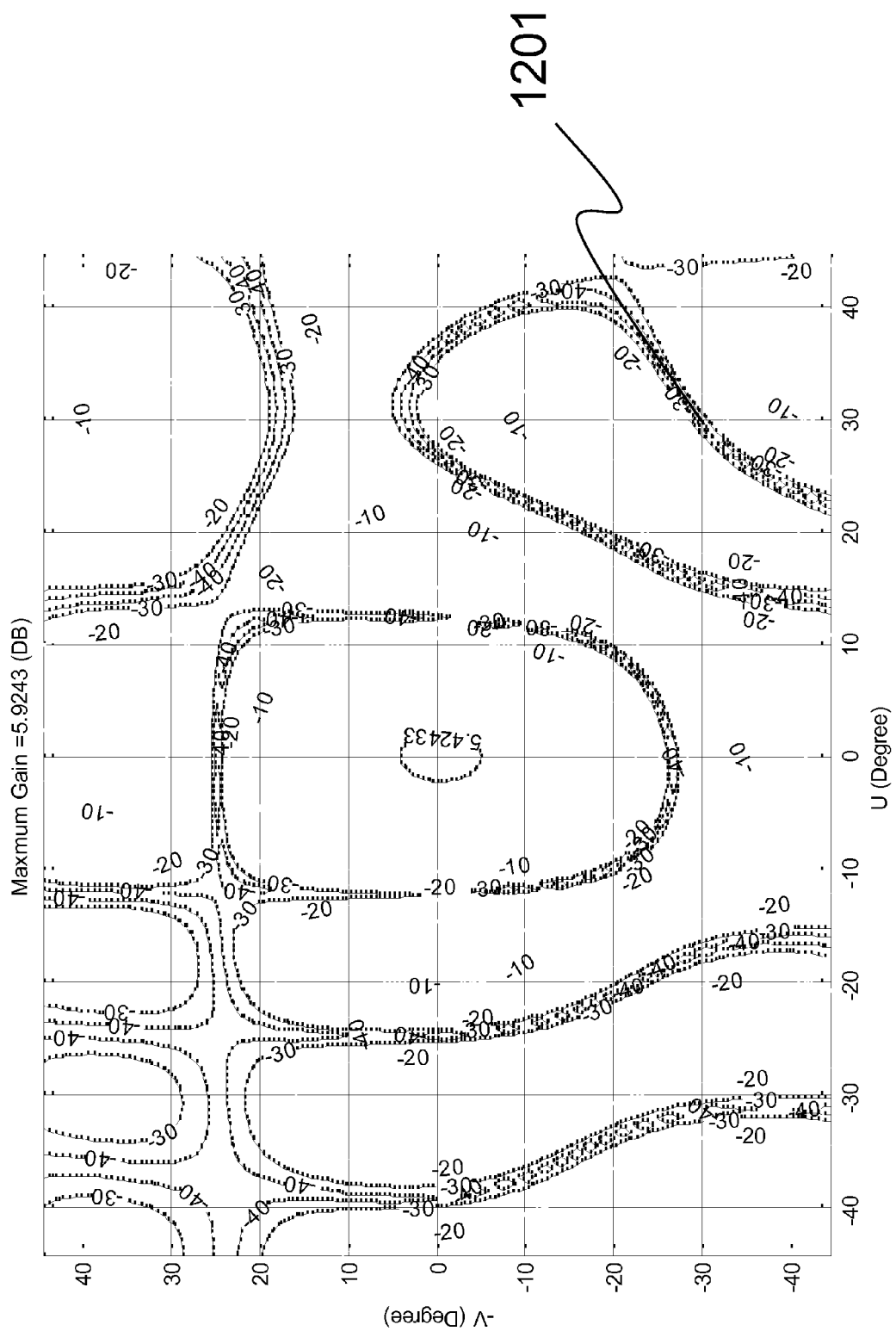
FIG. 12 shows the contours of the HP co-pol component using the proposed beam forming technique, which also uses the VP component for minimization of HP cross-pol.

As shown in FIG. 11 and FIG. 12, the co-pol energy at (30,−30) degree is above 16 dB while the cross-pol remains below the −30 dB level. Compared with traditional beam-forming techniques, the co-pol performance remains the same and but cross-pol is much lower. Similarly, the VP cross-pol component can be eliminated by using the HP co-pol component.

In conclusion, our present invention provides an advanced beam-forming technique that forms beam at specified locations and minimizes the cross-pol components by using orthogonal polarized signal information. The cross-pol power dropped dramatically in the simulation. All of the auxiliary information used is available and we can use part of the orthogonal co-pol component to reduce the amount of computation.

What is claimed is:

1. A beam-forming technique for a radio frequency terminal, comprising:
    an antenna array comprising a plurality of antenna elements, each of the antenna elements comprising a first port and a second port for receiving or transmitting a signal, the signal comprising a first co-pol component, a first cross-pol component, a second co-pol component and a second cross-pol component, the first co-pol component and the second cross-pol component having a first polarization, the second co-pol component and the first cross-pol component having a second polarization, the first polarization being orthogonal to the second polarization, each of the antenna elements receiving or transmitting the first co-pol component and the second cross-pol component via the first port and receiving or transmitting the second co-pol component and the first cross-pol component via the second port; and
    a transceiver system coupled to the antenna array, the transceiver system comprising:
        a digital beam forming processor having a first input and a second input, the digital beam forming processor receiving the first co-pol components from the antenna elements via the first input and the first cross-pol components from the antenna elements via the second input, the digital beam forming processor applying a beam weight vector to the first co-pol components to generate a first output signal comprising updated first co-pol components, while simultaneously applying the beam weight vector to the first cross-pol components to generate a second output signal comprising updated first cross-pol components; and
        an optimization module coupled to the digital beam forming processor, the optimization module receiving the first output signal and the second output signal and computing an updated beam weight vector based on adaptive algorithms and providing the updated beam weight vector to the digital beam forming processor.

2. The beam-forming technique of claim 1, wherein the first polarization is horizontal polarization and the second polarization is vertical polarization.

3. The beam-forming technique of claim 1, wherein the first polarization is left-handed circular polarization and the second polarization is right-handed circular polarization.

4. The beam-forming technique of claim 3, wherein the transceiver further comprises:
    a second digital beam forming processor having a third input and a fourth input, the digital beam forming processor receiving the second co-pol components from the antenna elements via the third input and the second cross-pol components from the antenna elements via the fourth input, the second digital beam forming processor applying a second beam weight vector to the second co-pol components to generate a third output signal comprising updated second co-pol components, while simultaneously applying the second beam weight vector to the second cross-pol components to generate a fourth output signal comprising updated second cross-pol components; and
    a second optimization module coupled to the second digital beam forming processor, the second optimization module receiving the third output signal and the fourth output signal and computing an updated second beam weight vector based on adaptive algorithms and providing the updated second beam weight vector to the second digital beam forming processor.

5. The beam-forming technique of claim 1, wherein the optimization module computes the updated beam weight vector based on adaptive algorithms in order to maximize the first output signal while minimizing the second output signal.

6. The beam-forming technique of claim 1, wherein the digital beam forming processor comprises a weighting unit.

7. The beam-forming technique of claim 4, wherein the second optimization module computes the updated second beam weight vector based on adaptive algorithms in order to maximize the third output signal while minimizing the fourth output signal.

8. The beam-forming technique of claim 4, wherein the second digital beam forming processor comprises a second weighting unit.

9. The beam-forming technique of claim 1, wherein the antenna elements comprise conical feeds.

10. The beam-forming technique of claim 1, wherein the beam weight vector has same number of components as the number of antenna elements.

11. A beam-forming technique for a radio frequency terminal, comprising:
    an antenna array comprising a plurality of antenna elements, each of the antenna elements comprising a first port and a second port for receiving or transmitting a signal, the signal comprising a first co-pol component, a first cross-pol component, a second co-pol component and a second cross-pol component, the first co-pol component and the second cross-pol component having a first polarization, the second co-pol component and the first cross-pol component having a second polarization, the first polarization being orthogonal to the second polarization, each of the antenna elements receiving or transmitting the first co-pol component and the second cross-pol component via the first port and receiving or transmitting the second co-pol component and the first cross-pol component via the second port; and a transceiver system coupled to the antenna array, the transceiver system comprising:
  a digital beam forming processor having a first input and a second input, the digital beam forming processor receiving the first co-pol components and the second co-pol components from the antenna elements via the first input, and receiving the first cross-pol components and the second cross-pol components from the antenna elements via the second input, the digital beam forming processor applying a beam weight vector to the first co-pol components and the second co-pol components to generate a first output signal comprising updated first co-pol components and updated second co-pol components, while simultaneously applying the beam weight vector to the first cross-pol components and the second cross-pol components to generate a second output signal comprising updated first cross-pol components and updated second cross-pol components; and
  an optimization module coupled to the digital beam forming processor, the optimization module receiving the first output signal and the second output signal and computing an updated beam weight vector based on adaptive algorithms and providing the updated beam weight vector to the digital beam forming processor.

12. The beam-forming technique of claim 11, wherein the first polarization is horizontal polarization and the second polarization is vertical polarization.

13. The beam-forming technique of claim 11, wherein the first polarization is left-handed circular polarization and the second polarization is right-handed circular polarization.

14. The beam-forming technique of claim 11, wherein the optimization module computes the updated beam weight vector based on adaptive algorithms in order to cancel the updated first cross-pol components by making the updated second co-pol components out of phase with the updated first cross-pol components.

15. The beam-forming technique of claim 11, wherein the optimization module computes the updated beam weight vector based on adaptive algorithms such that energy level of the updated second co-pol components is decreased to energy level of the updated second cross-pol components.

16. The beam-forming technique of claim 11, wherein the optimization module computes the updated beam weight vector based on adaptive algorithms such that energy level of the updated second cross-pol components and energy level of the updated second co-pol components are decreased.

17. The beam-forming technique of claim 11, wherein the number of components in the beam weight vector is double the number of antenna elements.

* * * * *